J. C. GILBERT.
TOY VEHICLE.
APPLICATION FILED APR. 2, 1919.

1,318,374.

Patented Oct. 14, 1919.

Inventor
J. C. Gilbert
By Attorney
Geo. H. Kennedy Jr.

UNITED STATES PATENT OFFICE.

JOHN C. GILBERT, OF GRAFTON, MASSACHUSETTS.

TOY VEHICLE.

1,318,374.  Specification of Letters Patent.  Patented Oct. 14, 1919.

Application filed April 2, 1919. Serial No. 286,921.

*To all whom it may concern:*

Be it known that I, JOHN C. GILBERT, a citizen of the United States, residing at Grafton, in the county of Worcester and Commonwealth of Massachusetts, have invented a new and useful Improvement in Toy Vehicles, of which the following, together with the accompanying drawings, is a specification.

My present invention relates to a toy vehicle having the similitude of an automobile and containing mechanism by which the vehicle may be propelled by the driver by means of an oscillating movement of a wheel in the position of the ordinary steering wheel of an automobile.

Figure 1:
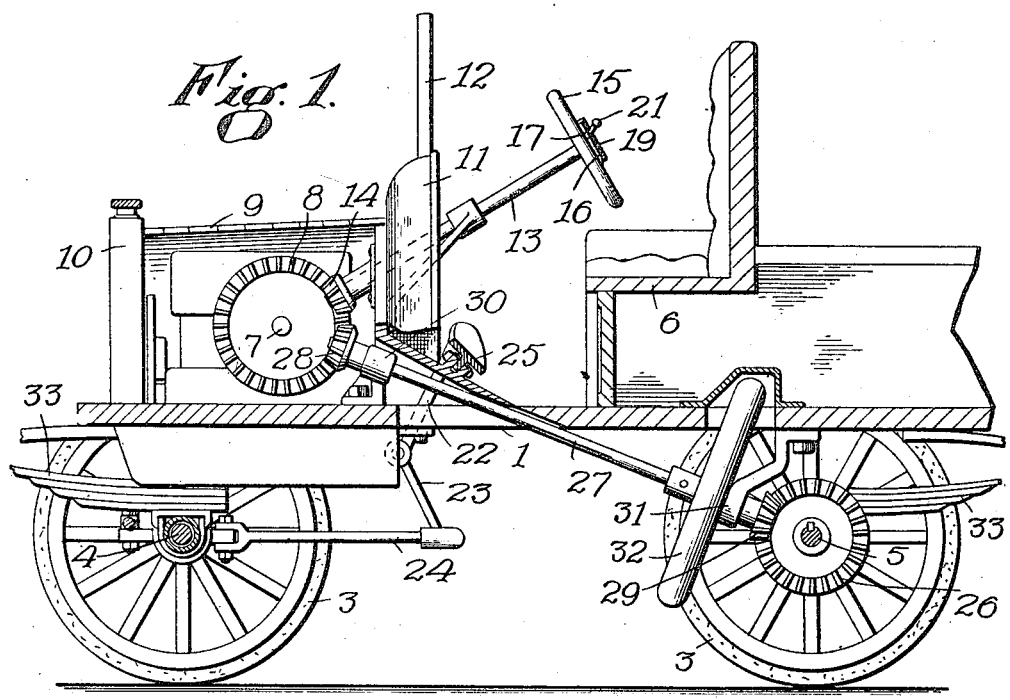
Figure 2:
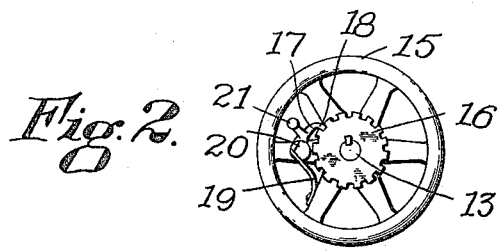

In the accompanying drawings,

Figure 1 is a side elevation of a toy vehicle embodying my present invention, the same being shown in longitudinal sectional view in order to disclose the operating parts, and Fig. 2 is a detached view of a ratchet mechanism by which the oscillation of a hand wheel is employed to propel the vehicle.

Similar reference characters refer to similar parts in both figures.

Referring to the accompanying drawings, 1 denotes the body of the vehicle mounted on supporting wheels 3, 3, which are carried on a front axle 4 and a rear axle 5. Mounted upon the body 1 is a driver's seat 6. In front of the seat 6 and journaled in bearings in the framework of the body is a short shaft 7 carrying a bevel gear 8. The shaft 7 and gear 8 are inclosed in a casing 9 which is given the appearance of an automobile hood, at the forward end of which is a frame 10 serving to support the hood 9 and having the appearance of the water tank of an automobile. To complete the similitude of an automobile, I provide the vehicle with a curved dashboard 11 upon which may be mounted a wind shield 12. Supported in suitable bearings is an inclined shaft 13 carrying at its lower end a beveled pinion 14 engaging the bevel gear 8. Journaled upon the upper end of the inclined shaft 13 is a hand wheel 15 occupying a similar position to the steering wheel of an automobile and in suitable position to be operated by a person upon the seat 6. Attached to the shaft 13 is a toothed wheel 16.

Carried upon one of the spokes of the hand wheel 15 is a dog 17 having a tooth 18 engaging the toothed wheel 16. A spring 19 is carried by one of the spokes of the hand wheel 15 with its free end bearing against a triangular projection 20 on the hub of the dog 17, with the pressure of the spring when it bears against one side of the triangular projection 20 adapted to hold the tooth 18 in engagement with the toothed wheel 16. But when the dog is rocked by the handle 21 to bring the pressure of the spring 19 against the other side of the triangular projection 20, the tooth 18 will be held out of engagement with the toothed wheel 16 and the vehicle can then be allowed to coast.

The mechanism between the hand wheel and the inclined post may be of any known construction by which a rotative movement of the hand wheel may be imparted to the post and discontinued at will.

Pivoted below the body 1 are levers 22 having arms 23 pivotally connected with rods 24 which connect with the steering mechanism of the vehicle. The levers 22 carry upon their upper ends pedals, enabling the rider to steer the vehicle by means of the foot pedals.

The steering apparatus, however, forms no part of my present invention, which relates to the method of imparting power to the rear axle by means of the rotative movement of the wheel 15. This is accomplished by placing a bevel gear 26 on the rear axle and attaching the same to the rear axle by a set screw or spline. The bevel gears 26 and 8 are connected by an intermediate shaft 27, carrying on its opposite ends pinions 28 and 29, said shaft being supported in bearings 30, 31, and carrying near its lower end a flywheel 32. Power is imparted to the shaft 13 by the rotative movement of the wheel 15 through the toothed wheel 16, and this power is communicated through the gear 8, intermediate shaft 27 and pinions 28 and 29 to the gear 26 carried upon the rear axle. One of the supporting wheels mounted upon the rear axle is attached thereto and the other wheel turns loosely thereon, thereby obviating the use of differential gears when the vehicle is to be turned to the right or left. The body of the wheel may be mounted directly upon the axles 4 and 5, or springs 33, 33 may be interposed if desired.

I claim,

1. In a vehicle of the class described, a rear axle, supporting wheels carried by said axle with one of said wheels attached thereto, an inclined shaft, a hand wheel carried thereon and capable of rotative movement independently of the inclined shaft, means for detachably connecting said inclined shaft and said hand wheel, whereby the rotative movement of the latter may be imparted to the inclined shaft at will, and connecting mechanism between the rear axle and said inclined shaft.

2. In a vehicle of the class described, a body, a rear axle, supporting wheels carried by said rear axle, a driving shaft, a hand wheel carried thereon and capable of a rotative movement independently of the shaft, a detachable connection between said shaft and the hand wheel, and operative connecting mechanism between said driving shaft and the rear axle.

3. The combination in a vehicle of the class described, comprising a body, an axle and supporting wheels carried thereon, of means for imparting rotary motion to said axle, comprising an inclined driving shaft, a hand wheel journaled thereon, means for connecting said driving shaft and hand wheel at will, and connecting mechanism between said driving shaft and said axle.

4. In an apparatus of the class described, a body, front and rear axles, supporting wheels carried thereon, a bevel gear on said rear axle, a shaft journaled above the body and transversely thereto, a beveled gear carried on said transverse shaft, an intermediate shaft between said transverse shaft and said rear axle, beveled pinions on the ends of said intermediate shaft engaging the beveled gears on said transverse shaft and said rear axle, a flywheel on said intermediate shaft, and means for imparting rotary motion to said transverse shaft.

5. In a vehicle of the class described, an inclined shaft, a hand wheel journaled on the upper end of said inclined shaft, a connection between said inclined shaft and said hand wheel capable of being disconnected at will, a rear axle, and a connecting mechanism between said rear axle and said inclined shaft including a flywheel.

6. In a vehicle of the class described, a body in the similitude of an automobile, an inclined shaft in the position of the steering post of an automobile, a hand wheel journaled on the upper end of said inclined shaft, a detachable connection between said hand wheel and said inclined shaft, a transverse shaft journaled in the front part of the body, a hood inclosing said transverse shaft, gearing between said inclined shaft and said transverse shaft, and a vehicle driving mechanism operatively connected with said transverse shaft.

7. In a vehicle of the class described, the combination of a body, rear and front axles, supporting wheels carried thereon, an inclined shaft, a rotatable member journaled on said inclined shaft, means carried by said rotatable member for operatively connecting it with said inclined shaft, a horizontal shaft journaled above said body and transversely thereto, means for operatively connecting said transverse and said inclined shafts, and a vehicle driving mechanism operatively connected with said transverse shaft.

JOHN C. GILBERT.

Witnesses:
NELLIE WHALEN,
PENELOPE COMBERBACH.

Copies of this patent may be obtained for five cents each, by addressing the "Commissioner of Patents, Washington, D. C."